(12) United States Patent
Bell et al.

(10) Patent No.: US 7,451,753 B2
(45) Date of Patent: Nov. 18, 2008

(54) PRE-HEATING OF A LIQUID IN AN AIRCRAFT RESERVOIR

(75) Inventors: Joshua David Bell, Toronto (CA); Kevin Allan Dooley, Mississauga (CA); William J. K. Savage, Milton (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

(21) Appl. No.: 11/425,811

(22) Filed: Jun. 22, 2006

(65) Prior Publication Data

US 2007/0245706 A1 Oct. 25, 2007

Related U.S. Application Data

(63) Continuation-in-part of application No. 11/379,621, filed on Apr. 21, 2006, now abandoned.

(51) Int. Cl.
*F02C 7/06* (2006.01)
*F01D 25/18* (2006.01)
*F01M 11/00* (2006.01)
*F02G 3/00* (2006.01)

(52) U.S. Cl. ............... 123/601; 60/39.08; 184/6.11; 184/6.28; 123/196 R

(58) Field of Classification Search .............. 123/196 R, 123/196 S, 196 AB, 41.33; 417/357, 366, 417/423.8; 310/52–65; 184/6.3, 6.4, 6.11, 184/6.28; 60/39.08
See application file for complete search history.

(56) References Cited

U.S. PATENT DOCUMENTS

| 2,463,898 | A | 3/1949 | Moore |
| 4,370,956 | A | 2/1983 | Moser et al. |
| 4,823,035 | A | 4/1989 | Kudla et al. |
| 4,922,119 | A | 5/1990 | Raad et al. |
| 5,178,523 | A | 1/1993 | Cheng-Chung |
| 5,531,285 | A | 7/1996 | Green |
| 5,979,435 | A | 11/1999 | Pruett, Jr. |
| 6,206,093 | B1 | 3/2001 | Lee et al. |
| 6,561,155 | B1 | 5/2003 | Williams |
| 7,252,095 | B2 | 8/2007 | Watt |

FOREIGN PATENT DOCUMENTS

GB 741433 A 12/1955

OTHER PUBLICATIONS

EPO Search Report, EP07251635, Jul. 25, 2007.
Science and Reactor Fundamentals—Electrical. CNSC Technical Training Group. Revision 1—Mar. 2003, Retrieved from Internet: http://canteach.candu.org/library/20030801.pdf.
International Search Report, PCT/CA2007/000462, Jun. 22, 2007.

*Primary Examiner*—Stephen K. Cronin
*Assistant Examiner*—Hyder Ali
(74) *Attorney, Agent, or Firm*—Ogilvy Renault LLP

(57) ABSTRACT

An electric motor thermally associated with a liquid reservoir of an aircraft engine is selectively operated to generate heat for pre-heating a liquid in a reservoir prior to engine start.

14 Claims, 3 Drawing Sheets

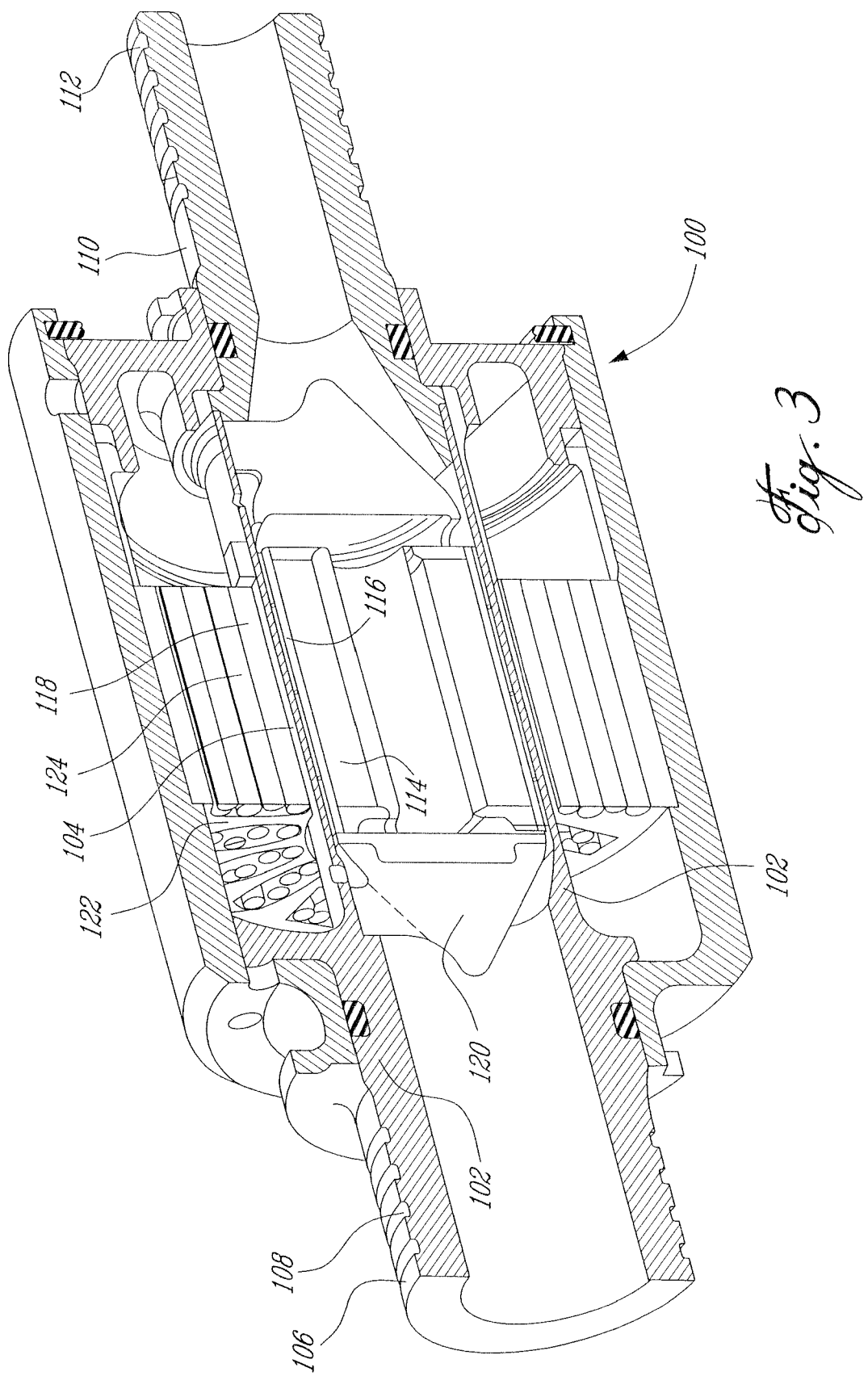

US 7,451,753 B2

PRE-HEATING OF A LIQUID IN AN AIRCRAFT RESERVOIR

CROSS-REFERENCE TO RELATED APPLICATION

This application is a Continuation-in-part of U.S. patent application Ser. No. 11/379,621 filed Apr. 21, 2006, now abandoned the contents of which is hereby incorporated by reference.

TECHNICAL FIELD

The invention relates to a method and a system for pre-heating a liquid in an aircraft reservoir.

BACKGROUND

The viscosity of a liquid is generally inversely proportional to its temperature. During a cold start, liquids in reservoir(s) may have a viscosity that makes them difficult to pump until they reach a higher temperature after a warm-up period. Opportunities for improvement exist.

SUMMARY

In one aspect, the present invention provides an apparatus for pre-heating a liquid in a reservoir of an aircraft engine, the apparatus comprising: a liquid system communicating with the aircraft engine; an electric motor connected to a pump for pumping the liquid in the reservoir, the pump communicating with the liquid system, at least the motor mounted to the reservoir, and a controller adapted to selectively set the electric motor at least in a pre-heating mode and pumping mode, the controller in the pre-heating mode controlling the motor to generate and transfer heat to the liquid in the reservoir while controlling at least one of the pump and the motor to substantially prevent pumping of liquid to the liquid system.

In another aspect, the invention provides an apparatus for heating liquid in a reservoir of a gas turbine engine, the apparatus comprising: an electric motor thermally associated with the reservoir, the motor having a rotor; means for selectively locking the rotor of the motor while electrical power is provided to the motor so as to generate heat to thereby transfer heat to the liquid in the reservoir.

In another aspect, the invention provides a method of pre-heating liquid of an aircraft engine, the method comprising: providing an electric motor mounted to a reservoir; pre-heating the liquid prior to engine start by operating the electric motor to thereby heat the liquid; and then starting the engine.

In another aspect, the invention provides a method of pre-heating liquid of an aircraft engine, the method comprising: providing an electric pump mounted to a reservoir, the pump and the reservoir communicating with an aircraft engine liquid system; pre-heating the liquid in the reservoir by supplying electrical power to the electric pump, thereby causing the pump to heat the liquid; controlling the pump to prevent pumping of liquid to the aircraft engine liquid system during said pre-heating; and then starting the engine.

BRIEF DESCRIPTION OF THE FIGURES

For a better understanding and to show more clearly how it may be carried into effect, reference will now be made by way of example to the accompanying figures, in which:

FIG. 3 is a perspective cross-sectional view of an example of an electric pump unit shown in FIG. 2.

DETAILED DESCRIPTION

Figure 1:
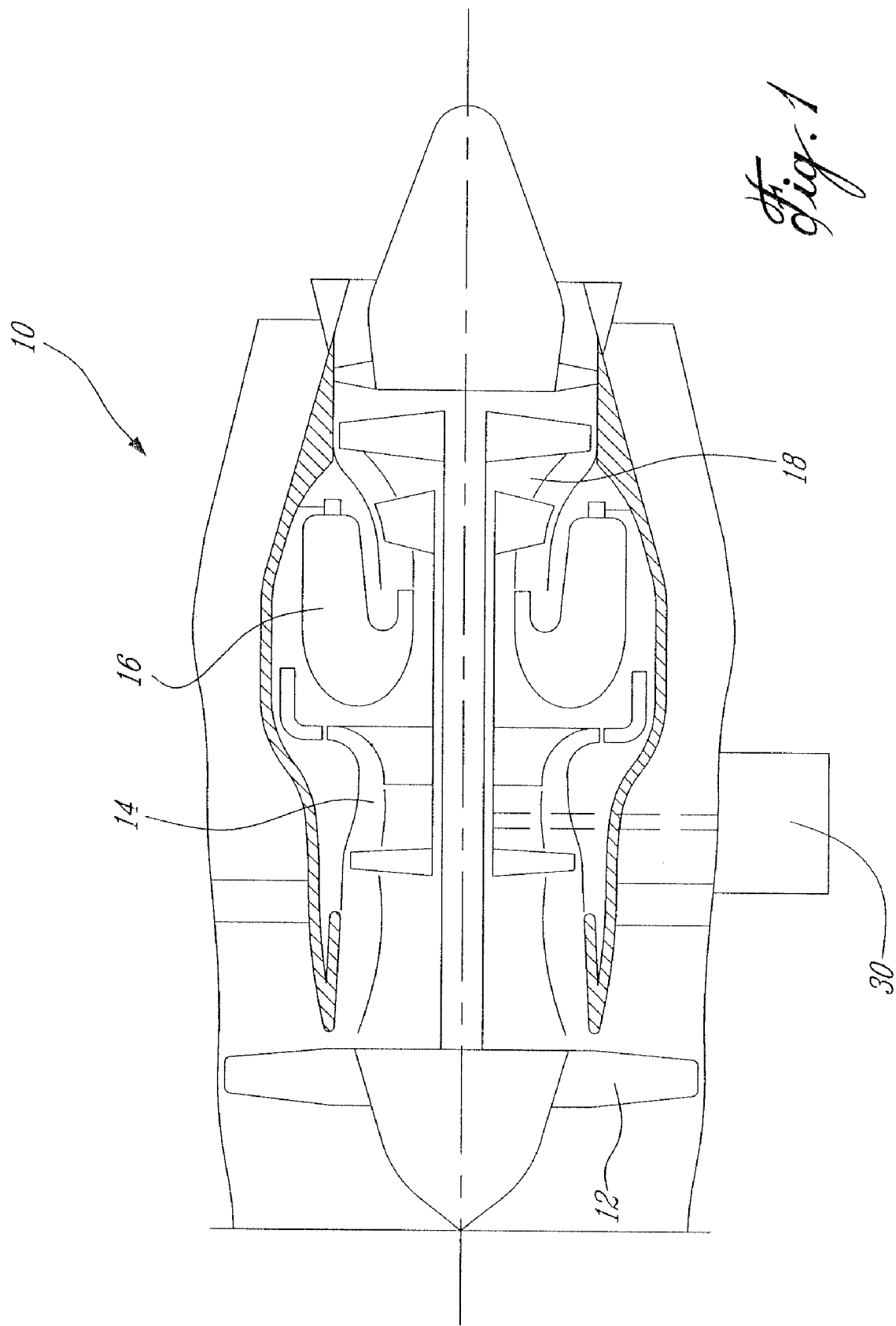
FIG. 1 is a schematic side view of a gas turbine engine incorporating the present apparatus.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The engine 10 is associated with a liquid reservoir 30 which is connected for communication with and a corresponding system (not depicted).

Figure 2:
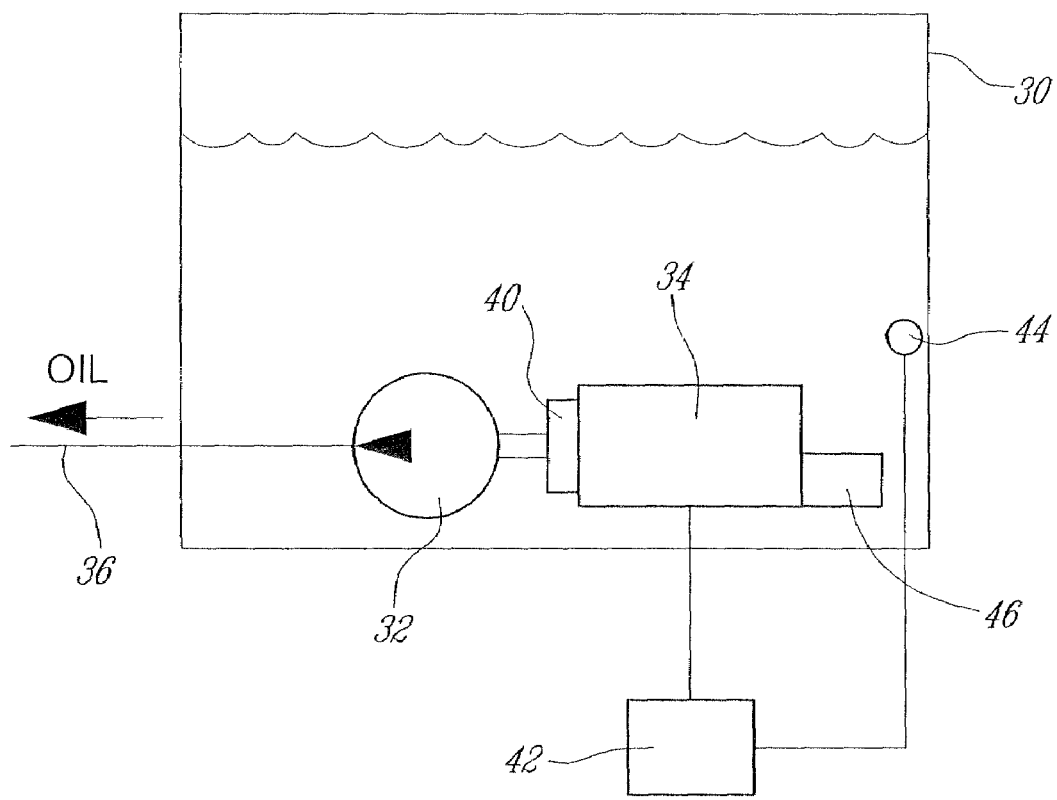
FIG. 2 is a schematic view of a portion of the apparatus of FIG. 1.

FIG. 2 shows the interior of the reservoir 30, an example of which being an oil reservoir. In the illustrated embodiment, a pump 32 and its corresponding electric motor 34 are disposed inside the reservoir and submerged in the liquid. In this description, the pump 32 and motor 34 are described as being separate, however the skilled reader will appreciate that these devices are often integrally provided to form an electric pump unit. The electric motor 34, when energized, operates the pump 32 at a desired pumping rate for normal pumping operation. The liquid flows out of the pump 32 and the reservoir 30 through a pressurized outlet 36 to circulate to the corresponding system (not depicted).

Prior to starting in cold temperatures, where liquid viscosity is above a pre-determined threshold (referred to herein as a "cold start"), the motor 34 is used to generate heat, preferably in this embodiment without also operating the pump 32. The motor 34 is driven in a "heating mode", whereby electrical power is provided to the motor 34, but without causing the liquid to flow at the outlet 36 of the pump 32. This way, the operation of the motor 34 is used to transfer heat to the liquid, thereby heating the liquid. The heating mode is preferably selected until one or more criteria is met, such as the liquid rises above a given minimum temperature or a pre-determined pre-heating time has expired. Additional or alternate criteria may be defined.

Various techniques can be used to prevent the pump 32 from pumping in spite of electrical current being provided to the motor 34. One is to use a mechanical locking device 40, which may be positioned on the motor 34, the pump 32 or an intermediate shaft (if any) or other mechanical component of the apparatus. The mechanical locking device 40 can include, for example, a retractable locking pin that is selectively engageable into a corresponding aperture in a moving component. When engaged in the aperture, the pin locks the rotor and prevents it from moving, and therefore impedes pumping from occurring. This way, when electric current is provided to the windings of the electric motor 34, more heat is generated in the windings than if the motor 34 rotates. This heat is then transferred to the liquid. Another mechanical solution, depending on the configuration of the motor and pump, is to employ a mechanical disconnect or clutch between the motor and pump, which when engaged allows motor operation without pumping, such motor operation heats the liquid prior to engine start.

The rotor of the motor 34 can also be "locked" using non-mechanical methods, such as providing uncommutated current to the motor 34, which current results in the windings procuring no net torque to the rotor. For instance, the uncommutated current can be a DC or AC current provided to at least one phase winding of a three-phase motor. This prevents rotation of the rotor, while generating electrical heating power in the windings and stator system. Another method of essentially locking the motor 34 involves driving the motor alternately forward then backward in small amounts, providing added friction heating to the liquid.

In another aspect, a bypass valve may be provided (not shown) such that the pump, pump outlet or pump inlet is effectively disconnected from the liquid circuit, such that operation of the motor and pump does not result in liquid being sent to the liquid circuit, but rather is retained within the reservoir. In this approach, motor operation occurs without effective pumping (i.e. nothing is effectively supplied to the liquid circuit), and motor operation is employed to heat the liquid prior to engine start.

Regardless of the approach employed, a controller 42 is preferably provided to select the mode (i.e. pre-heat, normal pumping, etc.) in which the motor 34 operates. In the case of the mechanical options described above, the controller 42 actuates the mechanism, such retractable pin or clutch. For the electrical options, the controller 42 selects which type of a commutated or uncommutated current will be provided to the electric motor 34. In the pump by-pass options, the controller 42 appropriately sets the bypass mechanism.

The controller 42 may be operated manually, such as by pilot command, or may be controlled automatically by an electronic engine control (not shown). A temperature sensor 44 can be provided in the reservoir 30 to provide feedback to the controller 42, or to the pilot or the engine controller. If desired, the temperature sensor 44 can be used to automatically select the heating mode when the temperature is lower than a predetermined level. Alternately, a timer (not shown) may count down a pre-heating time, during which the pre-heating means are operated, and communicate the elapsed time to the pilot or engine controller.

To further increase the rate of heat transfer between the electric motor 34 and the liquid, a heat transfer enhancing device 46, such as a fin or set of fins, can optionally be provided around the housing of the motor 34, or on the reservoir in the proximity of the motor 44, or both. Also, it is possible to provide the motor 34 on the outside wall of the reservoir 30 and transfer the heat to the liquid through the wall, optionally with a heat transfer enhancing device 46 preferably located inside the reservoir in contact with the liquid.

FIG. 3 illustrates an example of a unit which incorporates a motor 34 and a pump 32. This pump unit is referred to as a helix pump 100, and will be briefly described for exemplary purposes, however a further description is found in applicant's co-pending application Ser. No. 11/017,797, filed Dec. 22, 2004.

The helix pump 100 includes a cylindrical housing 102 having at one end a working conduit 104, a pump inlet 106, and pump outlet 110. Connection means 108, 112, are provided on pump inlet 106 and pump outlet 110 for connection with the liquid in the reservoir and liquid circuit, respectively. A rotor 114 is positioned within the working conduit 104 and includes plurality of permanent magnets 118 within sleeve 116 in a manner so as to provide a permanent magnet rotor suitable for use in a permanent magnet electric motor. The rotor 114 is adapted for rotation within the working conduit 104. The external surface of the rotor 114 and the internal surface (not indicated) of the working conduit 104 permits a layer of working liquid (for instance oil) in the clearance between the rotor and the conduit. The rotor 114 includes a thread 120 to move the working liquid through this clearance, and thus through the pump. A stator 122, including 3-phase windings 124, surrounds the rotor 114, and the windings 124 are connected to a suitable control circuit for supplying electrical power to the windings 124. When appropriately commutated (or uncommutated, as the case may be) current is supplied to the windings 124, the rotor 114 may be controlled to rotate at a desired speed, to move back and forth in a slow of fast vibratory motion, or to effectively lock the rotor 114 in place by providing non-rotating current.

Overall, the present apparatus and method allow lowering the warm-up time of the liquid once the engine is started, thereby saving fuel and running time on the engine. They may also increase the life of strainers and insure that an adequate flow of liquid will be obtained for engine start-up.

The above description is meant to be exemplary only, and one skilled in the art will recognize that other changes may also be made to the embodiments described without departing from the scope of the invention disclosed as defined by the appended claims. For instance, any liquid where viscosity impedes start-up can be used. The mechanical locking arrangement is not limited to a retractable pin and can include any other suitable kind of brake or mechanical disconnect, or other suitable mechanical means. The pump and motor can be any suitable design, and may be separate or may be integrated together. The pump and/or motor need not be rotary in nature. The motor may be of any suitable type and configuration, and may be AC or DC. Also, if desired, the present invention can be used in conjunction with other systems and methods for heating the liquid in the reservoir, including using a resistive heater. As mentioned, the term "locking" is meant, in an extended sense, to include a mode where the rotor of the electrical motor is vibrating. The apparatus and method can have more than the two modes described above. For instance, the motor can be designed to allow a progressive acceleration or rotation of the pump as the liquid reaches its target temperature. The liquid reservoir may be located within the engine, mounted thereto, or located elsewhere. Although a turbofan is depicted, any type of aircraft engine may be used. The liquid can be fuel, anti-icing liquids, such as oil, glycol, or other suitable composition, hydraulic fluids, on-board water suppliers, and any other suitable liquids on board the engine or aircraft including liquid where viscosity at a low temperature is not an issue. Still other modifications which fall within the scope of the present invention will be apparent to those skilled in the art, in light of a review of this disclosure, and such modifications are intended to fall within the appended claims.

What is claimed is:

1. An apparatus for pre-heating liquid in a liquid reservoir of an aircraft engine, the apparatus comprising:
    a liquid system communicating with the aircraft engine;
    an electric motor connected to a pump for pumping the liquid from the reservoir into the liquid system, at least the motor mounted to the reservoir, and
    a controller associated with the electric motor and the pump to selectively set the electric motor and the pump at least in a pre-heating mode and a pumping mode, the motor in the pre-heating mode generating and transferring heat to the liquid in the reservoir while the pump is substantially prevented from pumping the liquid into the liquid system.

2. The apparatus as defined in claim 1 wherein the electric motor is mounted inside the reservoir.

3. The apparatus as defined in claim 1 wherein the electric motor is submerged within the liquid in the reservoir.

4. The apparatus as defined in claim 1, wherein the apparatus comprises a mechanical mechanism activated by the controller in the pre-heating mode to prevent at least one of the motor and pump from rotating and thereby substantially preventing the pumping of the liquid into the liquid system.

5. The apparatus as defined in claim 1, wherein the motor comprises a rotor having a plurality of windings, the controller providing uncommutated current to the motor in the pre-heating mode to heat the windings without rotating the rotor.

6. The apparatus as defined in claim 1, wherein the controller causes the motor in the pre-heating mode to vibrate without substantial rotation, thereby substantially preventing pumping of the liquid into the liquid system.

7. An apparatus for heating liquid in a reservoir of a gas turbine engine, the apparatus comprising:
   an electric motor thermally associated with the reservoir, the motor having a rotor;
   means for selectively locking the rotor of the motor while electrical power is provided to the motor so as to generate heat to thereby transfer heat to the liquid in the reservoir.

8. The apparatus as defined in claim 7 wherein the electric motor is connected to a pump.

9. The apparatus as defined in claim 7 wherein the motor is submerged within the liquid.

10. A method of pre-heating liquid of an aircraft engine, the method comprising:
    providing an electric pump unit mounted to a liquid reservoir, the pump unit and the reservoir communicating with an aircraft engine liquid system;
    pre-heating the liquid in the reservoir by supplying electrical power to the pump unit, thereby causing the pump unit to heat the liquid;
    controlling the pump unit to prevent pumping of liquid to the aircraft engine liquid system during said pre-heating; and then
    staffing the engine.

11. The method as defined in claim 10 wherein the electric pump unit is mounted inside the reservoir.

12. The method as defined in claim 10 wherein the electric pump unit is submerged within the liquid in the reservoir.

13. The method as defined in claim 10, wherein the step of controlling the pump unit comprises preventing the pump unit from rotating and thereby substantially preventing pumping of liquid prior to staffing the engine.

14. The method as defined in claim 10, wherein the step of controlling the pump unit motor comprises providing uncommutated current to the pump unit.

* * * * *

UNITED STATES PATENT AND TRADEMARK OFFICE
CERTIFICATE OF CORRECTION

| | | |
|---|---|---|
| PATENT NO. | : 7,451,753 B2 | Page 1 of 1 |
| APPLICATION NO. | : 11/425811 | |
| DATED | : November 18, 2008 | |
| INVENTOR(S) | : Joshua David Bell, Kevin Allan Dooley and William J. K. Savage | |

It is certified that error appears in the above-identified patent and that said Letters Patent is hereby corrected as shown below:

claim 10, column 6, line 11, delete "staffing" insert --starting--
claim 13, column 6, line 19, delete "staffing" insert --starting--

Signed and Sealed this

Tenth Day of February, 2009

JOHN DOLL
*Acting Director of the United States Patent and Trademark Office*